United States Patent [19]

Kuklinski et al.

[11] Patent Number: 4,975,035

[45] Date of Patent: Dec. 4, 1990

[54] METHOD OF MAKING A NICKEL HYDROXIDE-CONTAINING CATHODE FOR ALKALINE BATTERIES

[76] Inventors: Jerry Kuklinski, 834 Vauxhall St., Waterford, Conn. 06385; Phillip G. Russell, 61 Society Rd., Niantic, Conn. 06357

[21] Appl. No.: 296,653

[22] Filed: Jan. 13, 1989

[51] Int. Cl.$^5$ .............................................. B22F 1/00
[52] U.S. Cl. ...................................... 419/35; 419/30; 419/36; 419/54; 419/55; 419/57; 75/251; 75/246; 428/570; 428/550; 428/457; 428/680; 429/223; 204/292
[58] Field of Search ............... 429/193, 223, 236, 248, 429/188; 419/30, 36, 35; 204/292; 428/576, 457; 75/246

[56] References Cited

U.S. PATENT DOCUMENTS

| | | | |
|---|---|---|---|
| 3,926,671 | 12/1975 | Gutjahr et al. | 136/29 |
| 4,273,582 | 6/1981 | Gutjahr et al. | 75/222 |
| 4,443,526 | 4/1984 | Jackovitz et al. | 429/223 |

FOREIGN PATENT DOCUMENTS

H01M480 10/1987 Japan .

OTHER PUBLICATIONS

Journal of Power Sources, vol. 12, (1984), pp. 233–245, A. H. Zimmerman.
A. H. Zimmerman, Electrochemical Society Conference, May 1983, Abstract No. 40, p. 62.

*Primary Examiner*—Stephen J. Lechert, Jr.
*Assistant Examiner*—Nina Bhat

[57] ABSTRACT

The cathode-forming method involves incorporating cobalt into a nickel plaque so that the exposed surfaces and the pores of the nickel plaque are uniformly covered with cobalt. The plaque is then treated to form nickel hydroxide in the pores and on the surfaces thereof. The cobalt is thus diposed at the interfacial boundary of the nickel plaque and nickel hydroxide so as to reduce the impedance and enhance charge conduction of the cathode. The mode of incorporation can vary. Thus, the sintered nickel plaque can be soaked in an aqueous solution of a water-soluble salt of cobalt, such as cobalt nitrate, then dried and resintered. Another mode involves dispersing a water-soluble cobalt salt in an aqueous slurry of nickel particles and water-soluble binder for the particles. The nickel particles are thus uniformly covered with the dissolved cobalt salt and then are compacted into a plaque. The plaque is dried and finally sintered. The sintering decomposes the binder and cobalt salt, at least the latter forming decomposition products which act as pore formers, i.e., gases, to increase the porosity of the plaque, as well as being reduced to cobalt metal in the pores of the plaque.

7 Claims, 3 Drawing Sheets

DISCHARGE TIME (MIN)

METHOD OF MAKING A NICKEL HYDROXIDE-CONTAINING CATHODE FOR ALKALINE BATTERIES

BACKGROUND OF THE INVENTION

1. Field of the Invention

The present invention generally relates to an improved method of making cathodes and more particularly a nickel hydroxide - containing cathode for an alkaline battery.

2. Prior Art

It is known that the utilization of active material in a nickel plaque electrode containing nickel hydroxide can be improved by adding cobalt to the electrochemical impregnation (EI) bath during treatment of the nickel plaque. Utilization is defined as the ratio of the capacity, C, observed in the cell utilizing the electrode to the theoretical capacity, $C_{th}$, where $C_{th}$ is the product of active material (g) in the cell times a conversion factor, 0.289AH/g nickel hydroxide. Thus, a nickel plaque can be treated for several minutes in an EI bath containing both cobalt nitrate and nickel nitrate. The nickel plaque is made cathodic in the bath. Nickel hydroxide and cobalt hydroxide are formed in the plaque pores. During a subsequent conversion step in potassium hydroxide electrolyte, the hydroxides are converted to a crystalline structure which accepts a charge. However, the cobalt is not anchored at the sinter surface of the plaque.

A similar improvement in utilization can be obtained by adding cobalt metal powder to the nickel powder slurry during nickel plaque fabrication, to provide a uniform mixture of cobalt and nickel throughout the plaque.

The technique disclosed in Japanese patent JP60-231668 involves the addition of cobalt hydroxide or cobalt oxide to nickel plaque, without the subsequent conversion to cobalt. The hydroxide or oxide is used to protect the plaque surfaces from corrosion.

It is now believed that if cobalt metal could be firmly anchored at the interfacial boundary of the nickel plaque and nickel hydroxide active material deposited in the surfaces of the nickel plaque, an electrode having improved electrical properties could be produced.

Accordingly, there is a need for an improved method of concentrating cobalt metal at the described interfacial boundary in a nickel plaque electrode. Such method should be simple, inexpensive and impart enhanced electrical properties to the electrode. Preferably, the method should be capable of being carried out in several modes to suit individual circumstances.

SUMMARY OF THE INVENTION

The improved method of the present invention satisfies all the foregoing needs. The method is substantially as set forth in the Abstract of the Disclosure. Thus, the method concentrates cobalt metal in the pores and exposed surfaces of a formed nickel plaque either before it is sintered or afterwards, but before nickel hydroxide active material is deposited in the pores and exposed surfaces of the nickel plaque. The cobalt is thus concentrated at the interfacial boundary of the nickel plaque and nickel hydroxide to improve maintenance of low impedance and optimal charge conduction of the electrode.

The method can be carried out in either of two separate modes. Thus, one mode comprises soaking a sintered porous nickel plaque in an aqueous solution of cobalt salt, such as cobalt nitrate, then drying the plaque and resintering it to convert the cobalt salt to cobalt metal in the pores and exposed surfaces of the nickel plaque.

The second mode comprises dispersing a water-soluble cobalt salt in an aqueous slurry of nickel particles and water-soluble binder for the particles. The nickel particles are thus uniformly covered with the dissolved cobalt salt and then are compacted into a wet plaque. The plaque is then dried and subsequently sintered. During sintering the binder and cobalt salt decompose. At least the latter releases decomposition products which act as plaque pore formers to increase the porosity of the plaque and coat the pores with cobalt metal. No separate pore former is needed in the slurry. The result is a cobalt metal lining on all the exposed surfaces and pore walls to act as the desired interfacial barrier between the plaque nickel and subsequently deposited nickel hydroxide.

Various other features of the invention are set forth in the following detailed description and accompanying drawings.

Drawings

FIG. 1 is a schematic chart diagram of the flooded electrode discharge voltage for a conventional alkaline cell utilizing a novel nickel plaque treated in accordance with a first preferred embodiment of the method of the present invention;

FIG. 2 is a schematic chart diagram of the boilerplate cell discharge voltage for a conventional alkaline cell utilizing the novel nickel plaque treated in accordance with said first preferred embodiment of the present method; and, FIG. 3 is a schematic chart diagram of the flooded electrode discharge voltage for a conventional alkaline cell utilizing a novel nickel plaque treated in accordance with a second preferred embodiment of the method of the present invention.

Detailed Description

Figure 1:
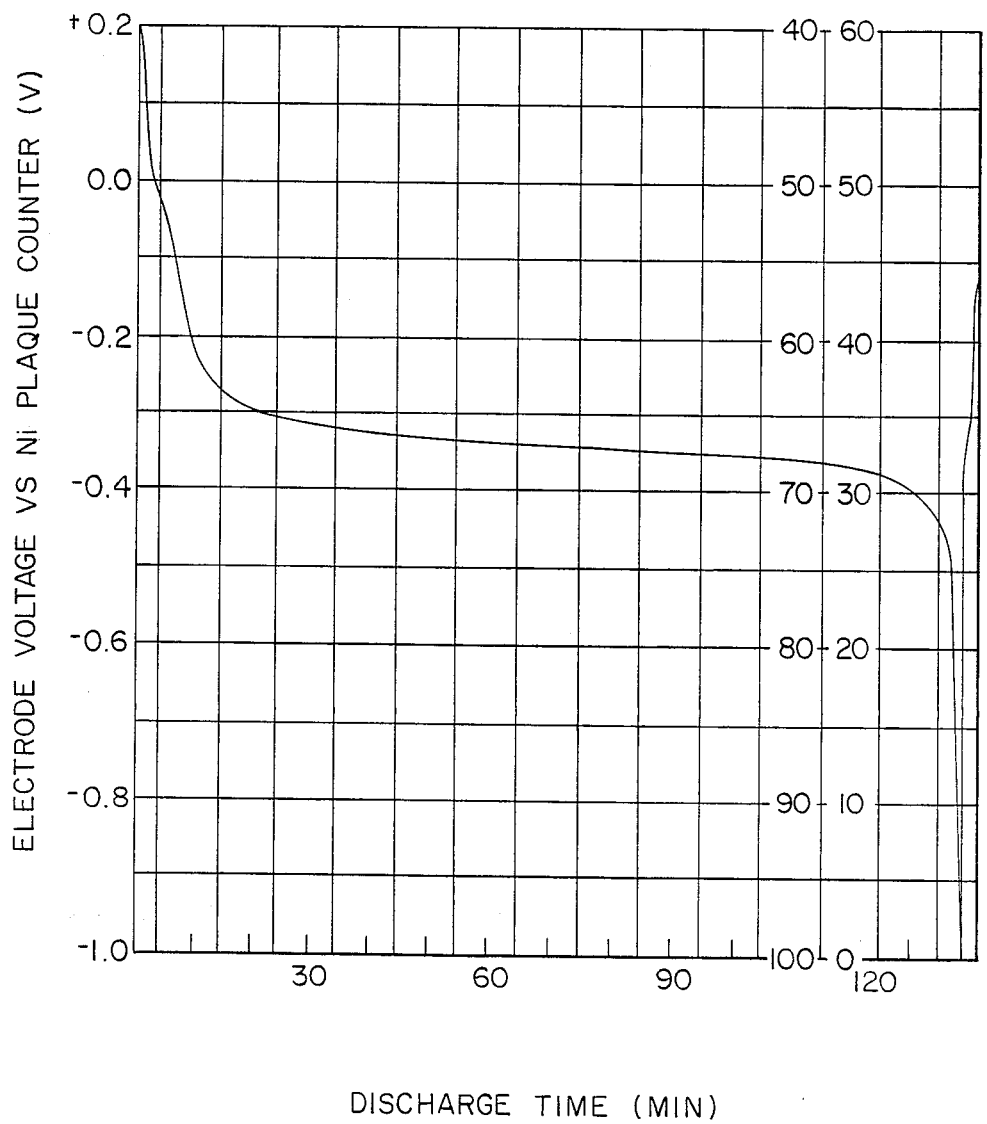

Now referring more particularly to the present method, it comprises making a nickel hydroxide - containing nickel plaque cathode in an improved manner. In this regard, cobalt metal is incorporated into the pores and exposed surfaces of a nickel plaque before or after it is sintered, so that the cobalt is disposed at the interfacial boundary between the plaque nickel and the nickel hydroxide active material subsequently introduced into the pores and surfaces of the nickel plaque for continued low impedance and maximum charge conduction.

Nickel sinter corrosion normally occurs at the nickel sinter/active material interface of a nickel plaque electrode during cell cycling. This results in an increase in $H_2$ pressure and a gradual build-up of a layer of pure nickel hydroxide at the interface, so that plate impedance gradually increases. However, when cobalt metal is present at that interface, as in the present method, it is incorporated into the corrosion layer as it develops so as to provide the cell with high utilization and absence of residual cell capacity recoverable only at low discharge rates.

Instead, with a cell utilizing the sintered plaque electrode prepared in accordance with the present method, at the end of discharge, the plate voltage drops very rapidly to −1.0 V with respect to the nickel counter-electrode voltage, without the occurrence of a low voltage plateau region. This type of discharge is a unique feature of the present invention and is observed only for the nickel plaques of the present invention having the cobalt metal layer at the nickel-nickel hydroxide interface. Other advantages of the present invention include an improved utilization of active material and increased cycle life.

In accordance with a first preferred embodiment of the present method, sintered nickel plaque prepared in the conventional manner is soaked in an aqueous solution of a water-soluble cobalt salt, then dried and resintered in a reducing atmosphere to reduce the cobalt salt to cobalt metal in the pores and exposed surfaces of the nickel plaque. Sinter porosity is decreased only slightly, for example, less than about 2 percent.

The technology utilized in initially preparing the sintered nickel plaque may be any conventional technology. As an example, one such technique comprises forming a nickel slurry of a binder, poreformer and nickel powder. Wet nickel plaque is usually fabricated in strips of appropriate thickness by pulling a nickel grid impregnated with the slurry up through a gap defined by a spaced pair of doctor blades. After drying, the green plaque is sintered in a furnace with a reducing atmosphere for several minutes at a temperature at, or above about 900° C. The resulting sintered plaque has a porosity of about 80–83 percent.

In accordance with a first preferred embodiment of the present method, nickel plaque, prepared in any one of a variety of conventional methods as described above, is soaked in an aqueous solution containing preferably about 0.5–2.0 M of cobalt nitrate or another water-soluble cobalt salt, such as cobalt bromide, cobalt chloride or cobalt perchlorate, at a suitable temperature, e.g. 70–90 degrees C. This introduces cobalt salt into the pores and exposed surfaces of the nickel plaque. The plaque is then dried in air for up to about 24 hours, then oven-dried, for example, for 2 hours at 70 degrees C. and then resintered at about 700–750 degrees C. in a reducing atmosphere, such as that produced by dissociation of ammonia. This step results in reduction of the cobalt nitrate or other cobalt salt to cobalt metal. For a soak in 2M cobalt nitrate solution, the weight gain for a 31 mil thick nickel plaque is approximately 43 mg/in$^2$ of the plaque. Sinter porosity is decreased less than 2 percent.

The cobalt-containing nickel plaque obtained from the above novel procedure is then treated by standard process technology to convert it to a finished electrode. This technology can be carried out by any suitable procedure which deposits nickel hydroxide in the pores and exposed surfaces of the nickel plaque. Such procedure usually involves three main steps, electrochemical impregnation (EI), followed by conversion, followed by capacity formation. During EI, the nickel plaque is made cathodic in an aqueous, slightly acidic bath of nickel nitrate containing a few percent of cobalt nitrate. Typically, the nickel nitrate is about 2–3 M. The bath is operated at about 80 degrees C. The current density and time are adjusted in order to obtain a uniform distribution of active material in the porous structure of the plaque. During impregnation, amorphous nickel hydroxide and cobalt hydroxide structures are deposited in the plaque pores and exposed plaque surfaces, as a result of the nitrate ion reduction to ammonia with formation of hydroxide ions.

The conversion step is usually carried out at ambient temperature in an electrochemical cell containing KOH electrolyte, with the impregnated plaque made the anode and the cathode being nickel 200. The amorphous nickel hydroxide cobalt hydroxide active material deposited in the EI step is converted to a crystalline structure which can be charged and discharged.

In the formation step, the plaque is cycled through several hot formation cycles in a cell containing typically 31 weight percent KOH to develop plate capacity and provide the finished cathode.

In a second preferred embodiment of the present invention, the cobalt dipping and resintering procedure described for the first preferred embodiment is dispensed with. Instead, during the initial formation of the nickel plaque, the previously described conventional procedure is modified to incorporate the step of adding an aqueous solution of a cobalt salt such as cobalt nitrate to the binder solution. For example, a 1M aqueous cobalt nitrate solution can be mixed with a slurry consisting of the binder (ethylene oxide polymer) previously wetted with methanol. The resulting mixture is allowed to stand, e.g. 2 hours, until the binder is completely dissolved in the solution. Thereafter, nickel powder can be added to the solution. The pore former can be eliminated because the cobalt nitrate during decomposition acts as a pore former. Wet plaque strips are formed from the slurry and processed through the sintering step as previously described. Standard EI, conversion and formation procedures are then carried out as previously described to provide the final sintered nickel plaque electrode.

Further features of the invention are set forth in the following specific examples.

Example I

A sintered porous nickel plaque was first prepared by standard technology. The wet plaque was placed on a nickel grid and pulled through spaced doctor blades, then dried at 80 degrees F. for 24 hours. The green plaque was cut into sections and then sintered at 900 degrees C.+ in a reducing atmosphere to provide a sintered nickel plaque about 30 mil thick having a porosity of about 80 percent.

The nickel plaque was then treated by the first preferred technique of the present method. Thus, it was soaked in an aqueous solution containing 2M cobalt nitrate at 80 degrees C. for 30 seconds. The wet plaque was air-dried for 24 hours, then oven-dried at 70 degrees C. for 2 hours, then resintered at 700 degrees C. in a reducing atmosphere. Porosity of the plaque decreased less than 2 percent. The weight change (reduction) from the weight of the dried plaque to that of the resintered plaque confirmed that the cobalt nitrate in the pores and exposed surfaces of the plaque was converted to cobalt metal by the resintering step.

Standard process technology was then employed to fabricate the plaque into a finished electrode. This comprised a first EI step in which the plaque was made the cathode in an aqueous, slightly acidic bath of nickel nitrate containing a few percent of cobalt nitrate. The anode was platinized titanium. The bath was operated at about 80 degrees C. The current density and time in the step were adjusted to obtain a uniform distribution of nickel hydroxide in the porous structure of the plaque. Amorphous cobalt hydroxide and amorphous nickel hydroxide were deposited in the plaque.

The plaque was then subjected to a conversion step. In this step, the plaque was made the anode in an aqueous electrolytic bath containing 15 weight percent of KOH. The counter electrode was made of nickel 200. The bath was at ambient temperature. The treating time was 2 hours. During this step, the amorphous cobalt hydroxide-nickel hydroxide material was converted to a crystalline structure which could be charged and discharged.

The plaque was then subjected to a formation step during which plate capacity was developed in a cell containing aqueous KOH electrolyte (31 weight percent) and a nickel 200 counter electrode. Several hot formation cycles were carried out in which the unformed plaque electrode was both charged and discharged at the C/2 rate for 2 hours, where C is the nominal plate capacity.

The electrical characteristics of the finished nickel plaque electrode prepared as described above are evident from a study of FIGS. 1 & 2. In FIG. 1, the flooded electrode discharge voltage is displayed, utilizing the finished plaque of this specific example, in a flooded electrolyte cell configuration employing unimpregnated nickel plaque as the counter electrodes and 31 weight percent KOH as the electrolyte. After 8 cycles, there was a 130% utilization at 20° C. The plate theoretical capacity was 1.75 AH, the discharge current was 1.0A and the discharge capacity was 2.27 AH.

It will be noted that the plate voltage dropped rapidly only at the end of discharge to $-1.0$ V with respect to the nickel counter electrode voltage, without the occurrence of a low voltage or second plateau region, before the end of discharge, as in conventional cells utilizing conventional nickel plaque electrodes. An increased cycle life and increased utilization of the active material were noted when the plaque of this example was used in a boilerplate cell.

Figure 2:
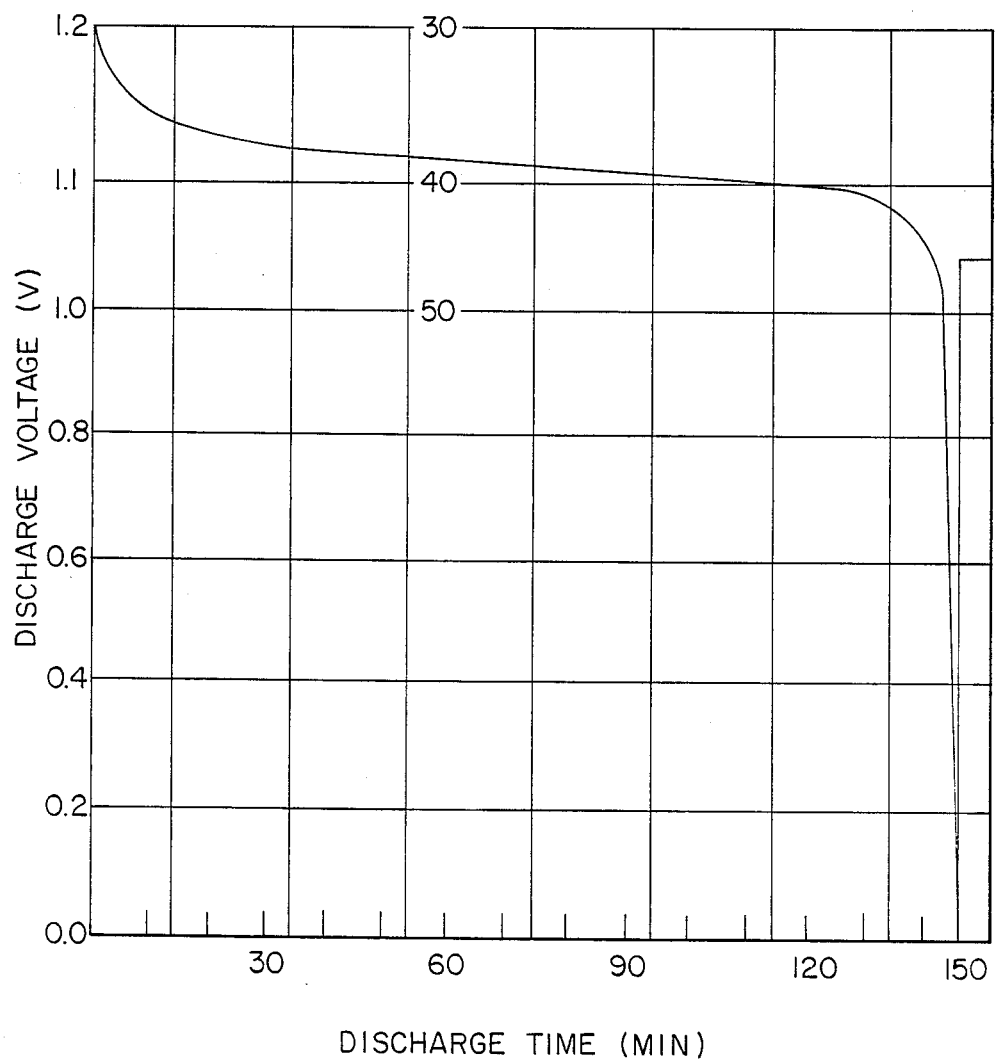

The discharge voltage is depicted in FIG. 2 for a boilerplate cell configuration. This cell contained 8 nickel plaque electrodes of this example along with 8 standard hydrogen electrodes in a starved electrolyte configuration. The cell was pressurized to about 900 PSIG with hydrogen when the nickel electrodes were fully charged. At cycle 51, 120% utilization to 1.0 V at 15 degrees C. was achieved. The cell theoretical capacity was 13.5 AH, the discharge current was 6.75 A and the discharge capacity 16.2 AH. Essentially, the same type of curve was obtained as seen in FIG. 1, with a sharp drop in voltage only at the very end of discharge, for maximum cell utilization.

Comparable results to those depicted in FIGS. 1 and 2 were obtained when nickel plaques were fabricated in parallel runs in accordance with the above-described procedure, of the present method, but where 1M and 0.5 M cobalt nitrate solutions were used in the dip and resintering step in place of the 2M solution. In each case, the weight gain of cobalt metal in the plaque is proportional to the solution concentration. It was also found that the soak times, drying times and temperatures and the like could be varied while giving similar results to those already described. Accordingly, the present method provides improved results.

Example II

The second preferred technique of the present method was employed in fabricating an improved sintered nickel plaque. Thus, the technique involved incorporating aqueous cobalt nitrate solution into the plaque before any sintering of the plaque was employed. Thus, an initial plaque-forming step was carried out, utilizing the formulation set forth in Table II below:

TABLE I

| Ingredients | Quantity |
| --- | --- |
| Ethylene oxide polymer (binder) | 45–50 g |
| Methanol | 140–220 g |
| Aqueous cobalt nitrate (2M) | 1.25–1.551 |
| Nickel powder | 1025–1275 g |
| Pore former | 0 |

The binder was first wetted with the methanol and then added with vigorous stirring to the cobalt nitrate solution. The solution was allowed to stand about 2 hours, that is, until the binder had completely dissolved, before the nickel powder was added to the solution to form a slurry with adequate viscosity for pulling plaque. Wet plaque strips were obtained as previously described in Example I, dried and then sintered at 900 degrees C. in a reducing atmosphere. The cobalt nitrate was reduced to cobalt metal in the pores and exposed surfaces of the plaque during sintering, and the cobalt nitrate reduction products served as pore formers for the plaque.

Figure 3:
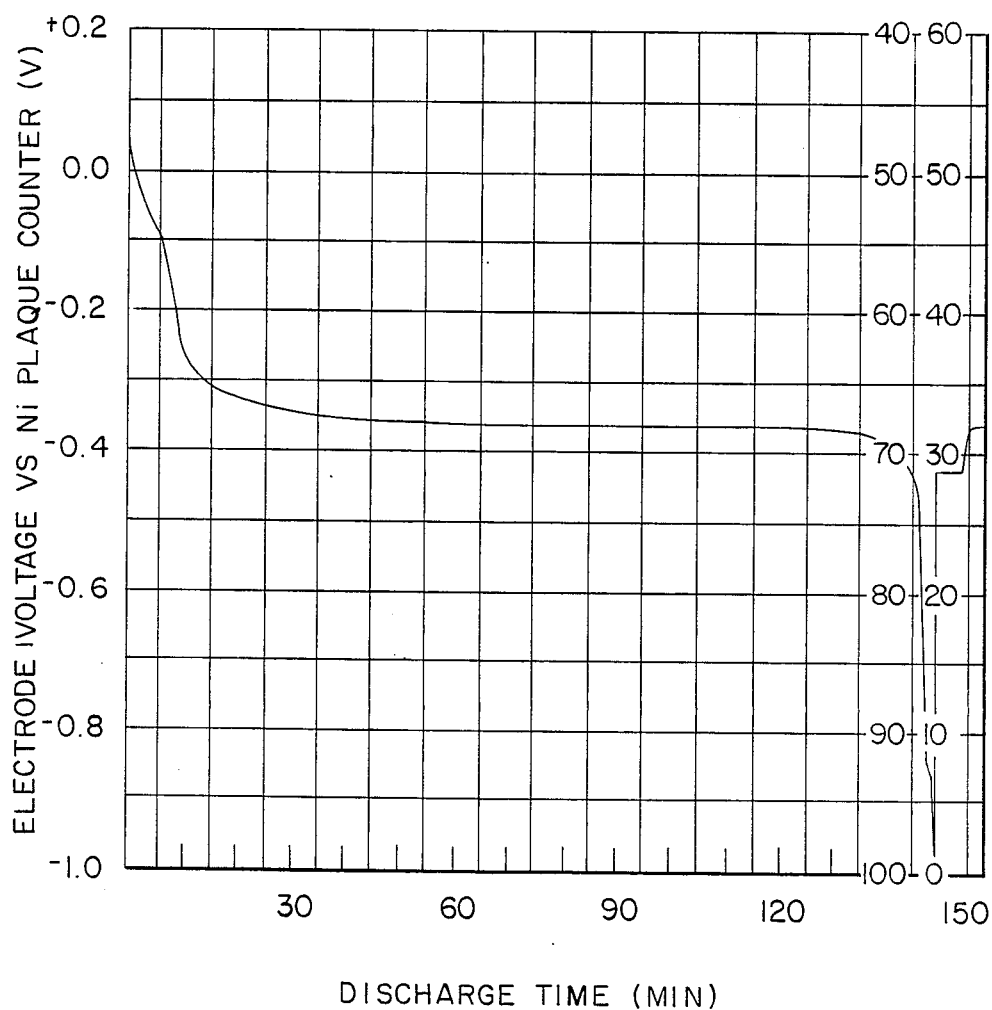

The resulting nickel plaque was then treated to the conventional steps of EI, conversion and formation previously described in Example I. The electrical characteristics of the finished nickel plaque were similar to those of the plaque of Example I. See, for example, FIG. 3 wherein the flooded electrode discharge voltage of an alkaline cell employing this plaque is depicted. The cell utilized a nickel 200 counter electrode as an anode and the nickel plaque as cathode. KOH was the electrolyte. At cycle 3, there was 124% utilization at 20 degrees C. The plate theoretical capacity was 1.60 AH, the discharge current was 0.8 A and the discharge capacity was 1.98 AH. The electrode voltage remained high during discharge until the very end thereof, at that point displaying a steep drop, rather than exhibiting a low voltage plateau well before the end of discharge, as encountered in cells utilizing conventional nickel plaque electrodes.

Similar results to those described above for the nickel plaque were obtained when 0.5 and 1 M cobalt nitrate solutions were substituted in parallel runs for the 2 M cobalt nitrate solution in the plaque-forming step.

In this technique, the binder solution keeps the cobalt nitrate dispersed during drying, thereby preventing formation of large salt crystals which could form void regions in the sintered plaque. Each particle of nickel powder is uniformly coated with cobalt nitrate and only one sintering step is employed. Moreover, cobalt nitrate acts as a pore former. Accordingly, this technique has a number of advantages over conventional methods.

Various modifications, changes, alterations and additions can be made in the present method, its steps and parameters. All such modifications, changes, alterations and additions as are within the scope of the appended claims form part of the present invention.

What is claimed is:

1. An improved method of making a nickel hydroxide-containing cathode for alkaline cell and batteries, said method comprising:
    (a) incorporating a cobalt metal layer into the exposed surfaces and pores of a porous sintered nickel plaque current collector; and, (b) subsequently forming nickel hydroxide active material in said exposed surfaces and pores, to provide an improved cathode whereby said cobalt is disposed directly at the interfacial boundary between said nickel plaque and said nickel hydroxide, providing improved maintenance of low impedance for optimal charge conduction.

2. The improved method of claim 1 wherein said sintered nickel plaque is first soaked in an aqueous solution containing dissolved cobalt-containing salt, then dried and thereafter resintered in a reducing atmosphere to convert said cobalt-containing salt adhering to the surfaces and pores of said plaque to cobalt metal.

3. The improved method of claim 2 wherein said cobalt salt is cobalt nitrate, wherein said resintering is carried out at about 700–750° C. and wherein the sinter porosity of said plaque is decreased less than about 2 percent.

4. The improved method of claim 3 wherein said cobalt nitrate is in a concentration of about 0.5–2 moles.

5. The improved method of claim 1 wherein a sintered nickel plaque is prepared by first adding an aqueous solution of cobalt salt and a binder together, and then adding nickel particles to said solution to form a slurry, the cobalt salt being in an amount sufficient to coat said particles, then forming a nickel plaque from said coated particles and thereafter sintering said plaque in a reducing atmosphere to form a finished porous sintered nickel plaque, with the cobalt converted from a salt to cobalt metal in the exposed surfaces and pores of said plaque.

6. The improved method of claim 5 wherein said binder comprises water-soluble ethylene oxide polymeric resin.

7. The improved method of claim 5 wherein said cobalt salt is cobalt nitrate in a concentration of about 0.5–2 moles.

* * * * *